D. H. TAYLOR.
AUTOMATIC COUPLING FOR MINE CARS.
APPLICATION FILED JUNE 16, 1911.
1,028,634.
Patented June 4, 1912.
2 SHEETS—SHEET 2.
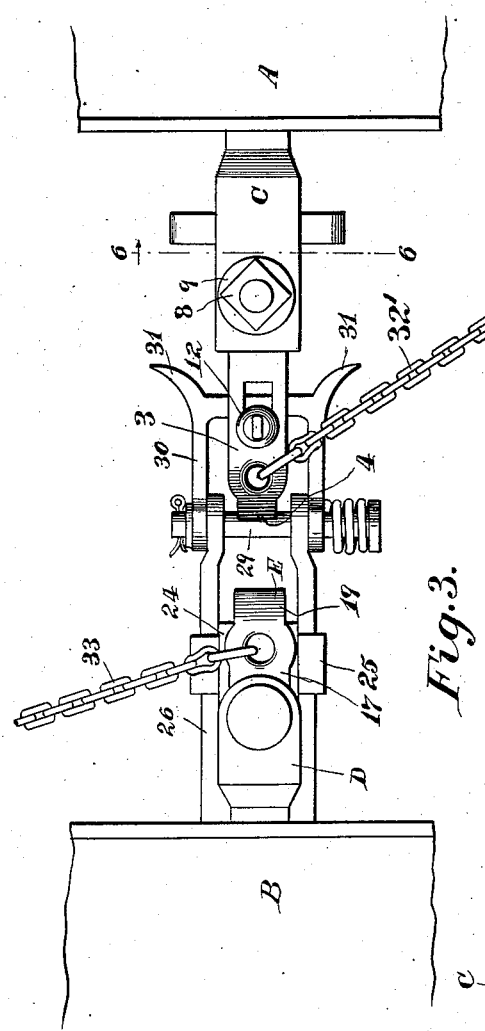
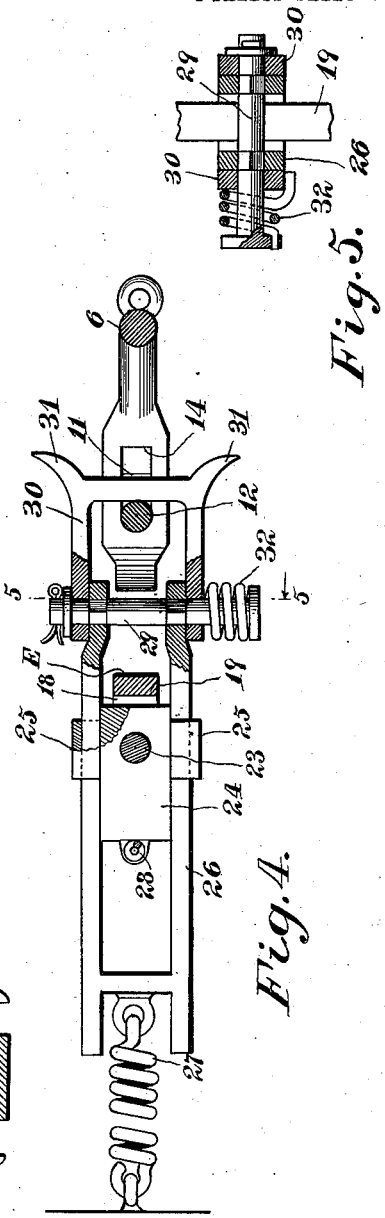
Witnesses
Thos. F. Knox.
Wm. Bagger
Inventor
Daniel H. Taylor
By Victor J. Evans
Attorney

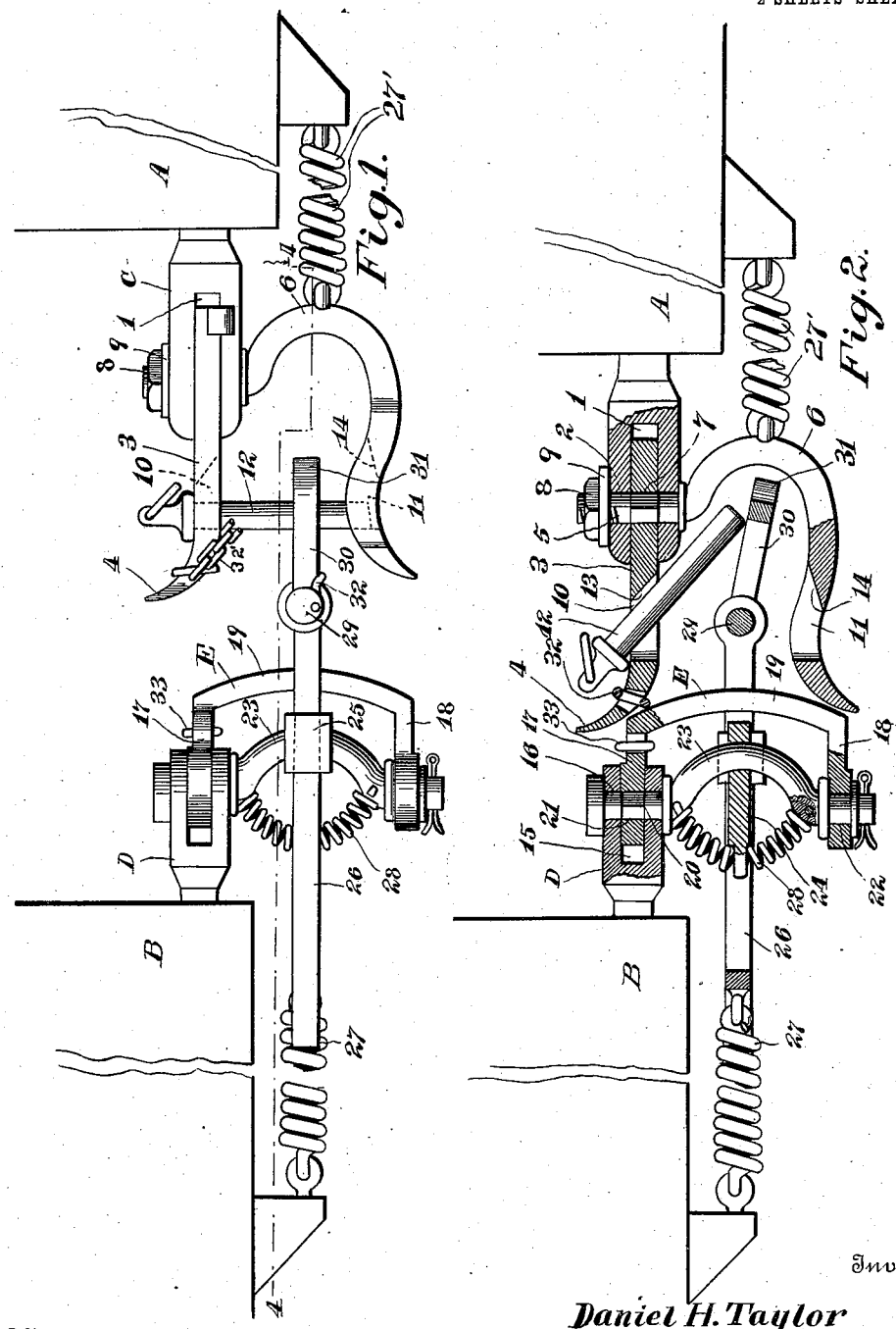

UNITED STATES PATENT OFFICE.

DANIEL H. TAYLOR, OF TERCIO, COLORADO.

AUTOMATIC COUPLING FOR MINE-CARS.

1,028,634.   Specification of Letters Patent.   Patented June 4, 1912.

Application filed June 16, 1911. Serial No. 633,496.

*To all whom it may concern:*

Be it known that I, DANIEL H. TAYLOR, a citizen of the United States of America, residing at Tercio, in the county of Las Animas and State of Colorado, have invented new and useful Improvements in Automatic Couplers for Mine-Cars, of which the following is a specification.

This invention relates to couplings for mining cars, and it has for its object to provide a device of this class which shall be simple in construction and efficient in operation and which shall be capable of readily yielding when short turns are to be made.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation showing the opposed ends of two cars connected by the improved coupling. Fig. 2 is a longitudinal sectional elevation showing the cars in the act of coming together to be coupled. Fig. 3 is a top plan view. Fig. 4 is a horizontal sectional view taken on the line 4—4 in Fig. 1, parts being broken away. Fig. 5 is a transverse sectional detail view taken on the line 5—5 in Fig. 4. Fig. 6 is a transverse sectional detail view taken on the line 6—6 in Fig. 3.

Corresponding parts in the several figures are denoted by like characters of reference.

The opposed ends of two cars shown at A, B are provided with drawheads C, D which may be formed at the ends of a beam extending longitudinally of the car. The drawhead C is provided with a longitudinal recess 1 intersected by a vertical opening 2. The recess 1 accommodates a guide member 3, the forward end of which is curved upwardly, as shown at 4. The aperture 2 receives the shank 5 of a hook member 6, said shank extending also through an aperture 7 in the guide member 3 which latter is thereby connected pivotally with the drawhead for movement in an approximately horizontal plane, while the hook member 6 is movable about the axis of the shank 5. The latter is provided with a nut 8 and washer 9, whereby it is operatively connected with the drawhead. The guide member 3 and the hook member 6 are provided with slots 10, 11 alining with each other for the accommodation of a coupling pin 12. The rear walls of the slots 10 and 11 are inclined, as shown at 13, 14, to enable the lower end of the pin 12 to be tilted rearwardly, as shown in Fig. 2.

The coupling head D is provided with a longitudinal horizontal recess 15 intersected by an aperture 16. The recess 15 receives the upper end or arm 17 of a vertically disposed yoke E which includes the upper and lower arms 17 and 18 that are connected by a curved bridge member 19. A connecting pin 20 extends through the aperture 16 in the drawhead D and through apertures 21, 22 in the arms 17, 18 of the yoke E, which yoke is thus connected with the drawhead for pivotal movement in an approximately horizontal plane. The connecting pin 20 is provided intermediate of its ends with a forwardly arched portion or offset 23. Said offset supports a block or plate 24 having apertured lugs 25 affording guides for the arms of a longitudinally slidable yoke 26, the rear end of which is connected with the car by means of a buffer spring 27. An arcuate coil spring 28, the ends of which are connected with the pin 20 adjacent to the ends of the offset 23, serves to engage and support the block 24, and to permit a limited rocking movement of said block and of the yoke 26 which is slidably connected therewith.

The forward end of the yoke 26 carries a pin 29 which is fixedly connected therewith and with which a link member 30 is pivotally connected. Said link member is provided at its front end with laterally divergent guide lugs 31, and a spring 32 which is coiled about and connected with the pin 29 is extended beneath the link member 30 to support the latter normally in an approximately horizontal position.

Suitably connected with the guide member 3 and with the yoke E are flexible elements, such as chains 32′, 33, whereby said members may be swung or moved in opposite directions to prevent the cars from coupling when they come together, if so desired.

As will be readily seen from the foregoing description, the yoke 26 carrying the link member 30 is normally supported by the spring supported block 24 to present the link member 30 normally in an approximately horizontal position. When the cars come together the link member 30 will engage the pin 12, tilting the latter rearwardly, as shown in Fig. 2, until it drops into engagement with the link, as shown in Fig. 1. The cars will thus be connected or coupled together securely, but in a flexible manner which will enable the cars to move readily about short turns as is frequently required in mines where the improved coupling is especially designed to be used. The coupling is automatic in its action, and the cars may be readily disconnected by simply lifting the pin 12 out of engagement with the link 30. When the pin is thus lifted, the yoke E and the pin carrying member 3 may be swung or moved in opposite directions, after which the pin may be restored to engaging position with reference to the hook member 6. The cars may thus be uncoupled while standing close together and may subsequently be moved out of engagement with each other.

The hook member 6 may, when desired, be connected with the body of the car by means of a spring 27', similar to the spring 27 which connects the yoke or slide 26 with the body of the opposed car. Such spring 27' will serve to automatically restore the hook member 6 to initial position after swinging said hook member to either side.

Having thus described the invention, what is claimed as new, is:—

1. In a car coupling, a drawhead having a longitudinal recess and an intersecting vertical aperture, a pivotally supported hook member having a shank engaging said aperture, a guide member engaging the recess of the drawhead and mounted upon the shank of the hook member, and a coupling pin carried by the guide member and the hook member.

2. In a car coupling, a drawhead having a longitudinal recess intersected by a vertical aperture, a hook member having a shank pivotally engaging the vertical aperture, said hook member being provided with a slot having an inclined rear wall, a guide member engaging the recess of the drawhead and pivotally connected with the shank of the hook member, said guide member being provided with a slot having an inclined rear wall, and a coupling pin extending through the slot of the guide member into the slot of the hook member.

In testimony whereof I affix my signature in presence of two witnesses.

DANIEL H. TAYLOR.

Witnesses:
W. R. WELLS,
C. H. CLAYPOOLE.